H. H. CUMMINGS.
ENGINE LOG FOR VESSELS.
APPLICATION FILED DEC. 6, 1909.

1,109,665.

Patented Sept. 8, 1914.
6 SHEETS—SHEET 5.

Fig. 5.

Witnesses:—
Edward Maxwell
H. C. Bowser.

Inventor
Henry H. Cummings,
by Geo. H. Maxwell,
Attorney.

H. H. CUMMINGS.
ENGINE LOG FOR VESSELS.
APPLICATION FILED DEC. 6, 1909.

1,109,665.

Patented Sept. 8, 1914.
6 SHEETS—SHEET 6.

Inventor
Henry H. Cummings.
by Geo. H. Maxwell,
Attorney.

Witnesses:—
Edward Maxwell.
H. C. Bowser.

UNITED STATES PATENT OFFICE.

HENRY H. CUMMINGS, OF NEWTON, MASSACHUSETTS.

ENGINE-LOG FOR VESSELS.

1,109,665.  Specification of Letters Patent.  Patented Sept. 8, 1914.

Application filed December 6, 1909. Serial No. 531,530.

*To all whom it may concern:*

Be it known that I, HENRY H. CUMMINGS, a citizen of the United States, and resident of Newton, in the county of Middlesex and State of Massachusetts, have invented Engine-Logs for Vessels, of which the following description, in connection with the accompanying drawings, is a specification, like letters on the drawings representing like parts.

My invention has for its object the provision of means for indicating primarily the revolutions of the engine at any point desired, as for instance the chart room, bridge, or engine room. Also, in the preferred embodiment of my invention, the miles traveled are indicated, and means is also provided for adjusting this indication of distance traveled in accordance with any given circumstances, as for instance with reference to the slip of the screw, draft of the vessel, condition of the bottom of the vessel, current, wind, etc.

Also my invention preferably includes means to indicate the length of time required for a given number of revolutions of the engine, and preferably means under the control of the observer for operating this time indicator whenever desired. Preferably also, in connection with the aforesaid mechanism, I provide means for translating the above indications into the usual terms of revolutions per minute.

The invention also preferably includes in a single organism, means under the control of the observer for controlling any or all of the above indicating means with reference to any one of the several engines of the ship.

My invention has the further advantage of providing means whereby the above indications are conveyed simultaneously by one and the same impulse from the engine to the chart room, bridge, engine room, or other desired place.

The constructional details, operation, and further advantages of my invention will appear more at length in the course of the following description, considered with reference to the accompanying drawings, in which I have shown a preferred embodiment of the invention.

In the drawings, Fig. 3ª is an enlarged perspective view, parts being broken away, showing a portion of the apparatus viewed from the back; Fig. 4ª is an enlarged sectional view of the left hand end of Fig. 4; and Fig. 4ᵇ is an enlarged horizontal sectional view of a part of the gear shown in Fig. 4ª; Fig. 7 is a central vertical sectional view of the indicator mechanism; Fig. 8 is an end view of the counter, looking at Fig. 3 from the left; Fig. 9 is a side view of one of the counters, and Fig. 10 is an edge view thereof; and Fig. 11 is a central longitudinal section of the counter mechanism My invention may be operated by any suitable conveying means for conveying the pulsations from the engines, but preferably I provide connections for operating the same by a column of water or steam, preferably the former. Also, while the indicating mechanism may be operated by any means which operates in unison with the engine, *i. e.*, any means capable of operating the counter at a distance, I prefer to operate it in connection with the cold water on its passage from the feed pump to the boiler while under full boiler pressure, the column of water being caused to pulsate by any suitable and convenient moving part of the engine.

Figure 2:
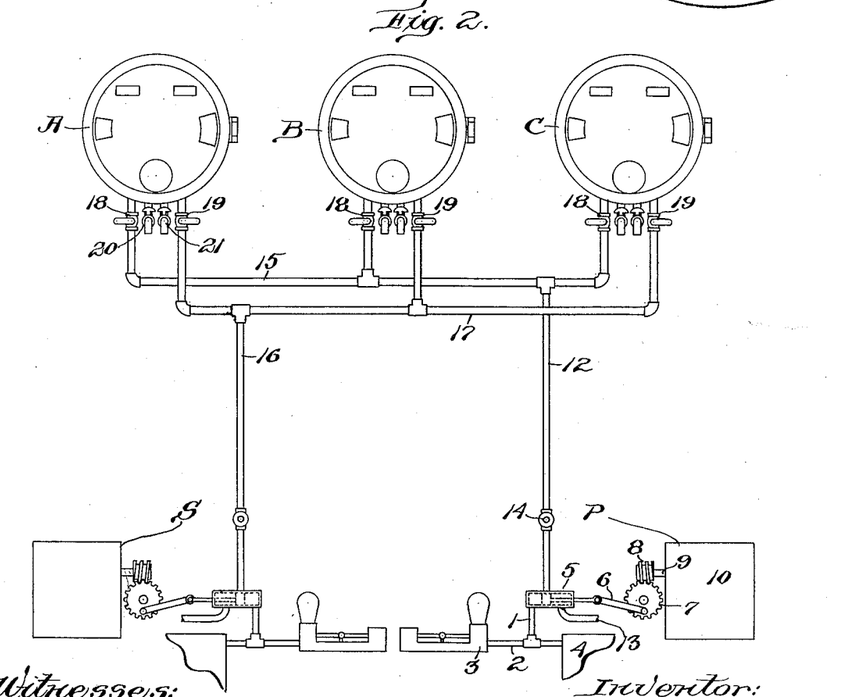
Fig. 2 is a view in front elevation, largely diagrammatic, to represent the entire apparatus or system.
Figure 6:
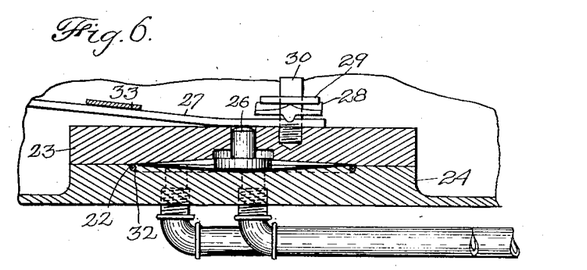
Fig. 6 is an enlarged sectional detail on the line 6—6, Fig. 5.

To restrain an improper flow of the water in the pipe 12, I provide regulating means 14 in said pipe 12, which may be set so as to permit any given flow from the pipe 12 when the latter is opened to the exhaust 13. One of the advantages of my invention is that it responds with equal accuracy and facility to the engine impulses irrespective of its position or location in the vessel, and accordingly I have indicated in Fig. 2 three sets of indicating mechanisms, A, B, C, which may, for instance, be located respectively in the engine room, chart room, and on the bridge, the pipe 12 being connected by a pipe 15 to the left hand side of each indicator to operate in connection with the port engine, for example (said engine being indicated by the letter P, Fig. 2) and a similar arrangement being indicated at 16, 17 connected to the right hand side of each indicator to operate in connection with the starboard engine, for example, (said engine being indicated by the letter S, Fig. 2). Said pipes are preferably provided respectively with hand operated valves 18, 19 for convenience, and also with air cocks 20, 21. At the back of the indicating mechanism I provide a diaphragm 22, preferably of highly resilient bronze, having a limited movement back and forth as best shown in Fig. 6, being clamped by a plate 23 on a boss 24 at the back of a shell or casing 25 which supports and contains the main operating parts of the mechanism. The water-column pipe and air-cock pipe open at the back side of the diaphragm 22, and a suitable cavity is provided in front of said diaphragm to permit the requisite movement.

When the apparatus is to be operated, the air cock is first opened and then the water pressure admitted, thereby driving out all the air, whereupon the air cock is closed, leaving the diaphragm free to respond thereafter to the best advantage to the impulses transmitted through the column of water. At its front side, the diaphragm bears against the head of a reciprocating pin or lever actuator 26 which engages a lever 27 fulcrumed against a washer 28 and yoke or transverse bar 29 positioned on a stud 30 and clamped by a bolt 31 against the back of said shell or casing.

Figure 1:
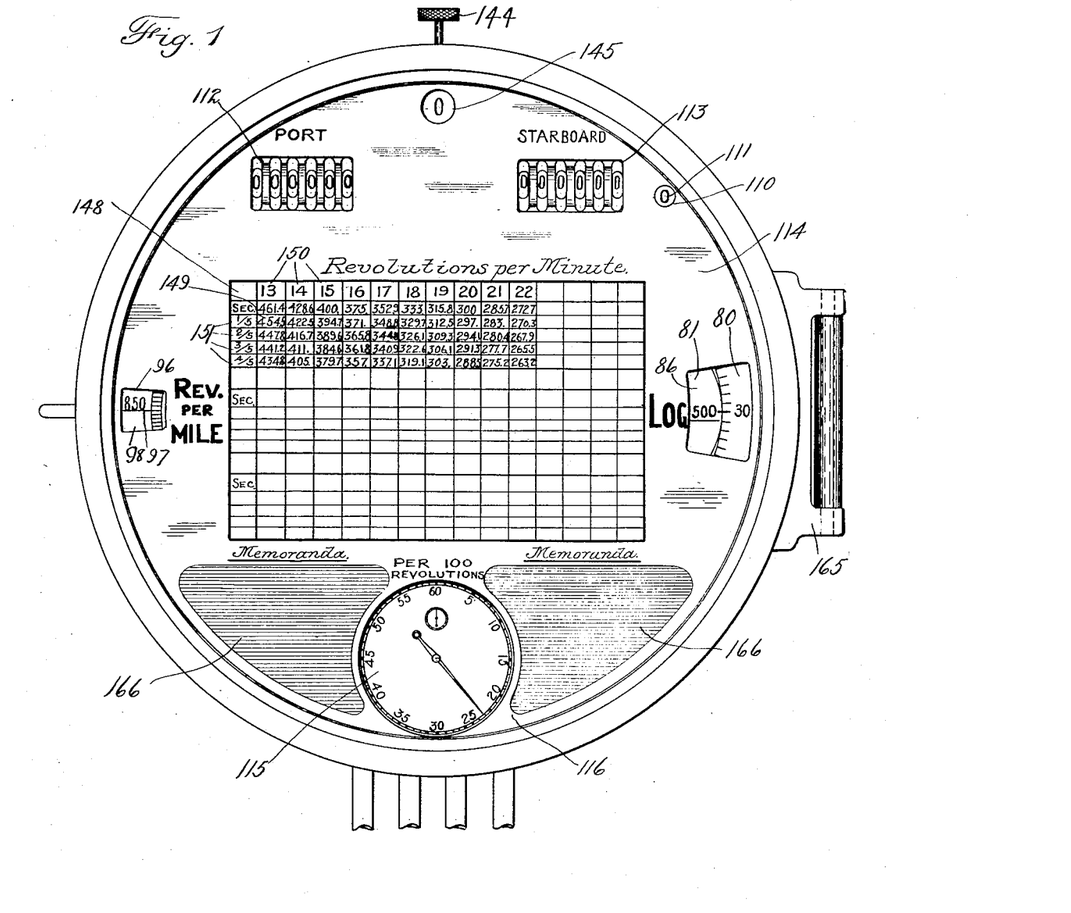
Figure 1 is a view in front elevation of the indicator end of my apparatus.
Figure 3:
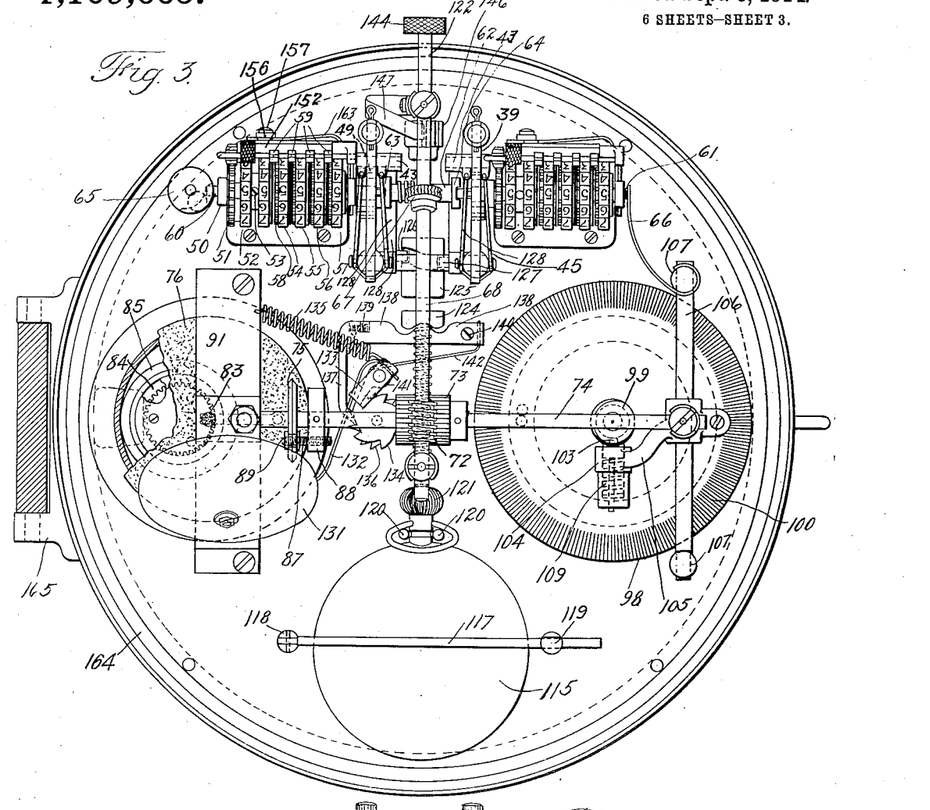
Fig. 3 is a rear view of the front portion of the indicator.
Figure 3A:
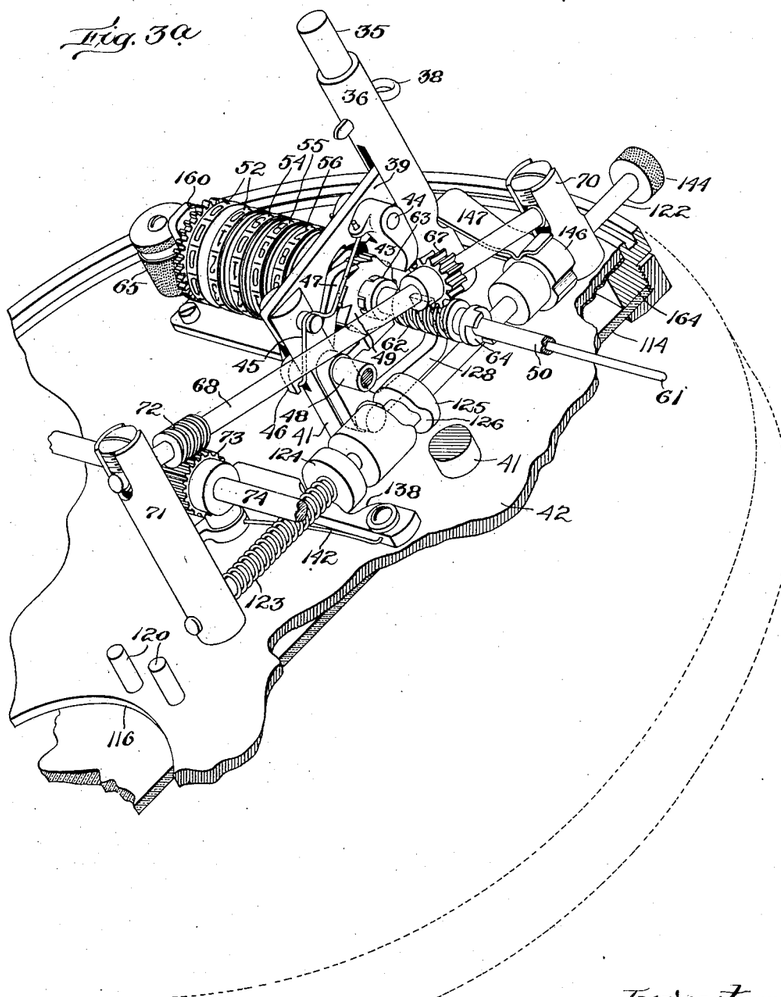
Figure 4:
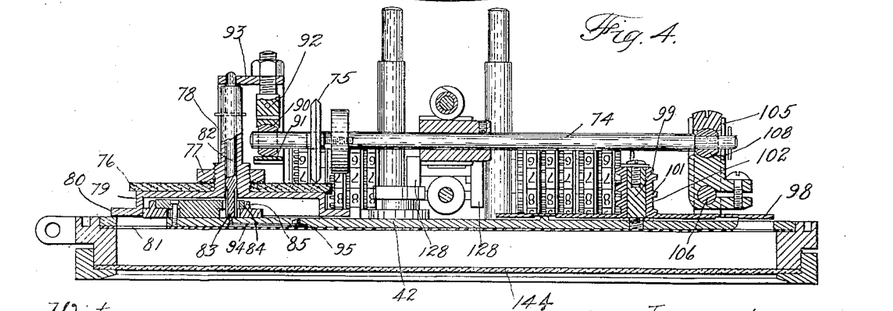
Fig. 4 is a horizontal central cross-sectional view Fig. 3.
Figure 4A:
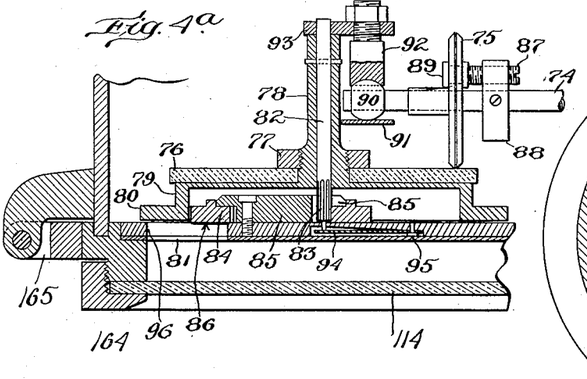
Figure 4B:
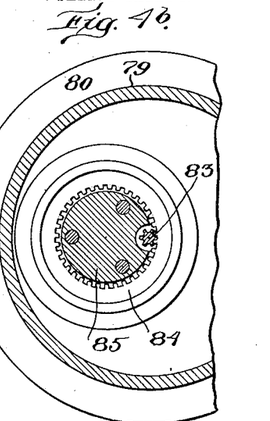
Figure 5:
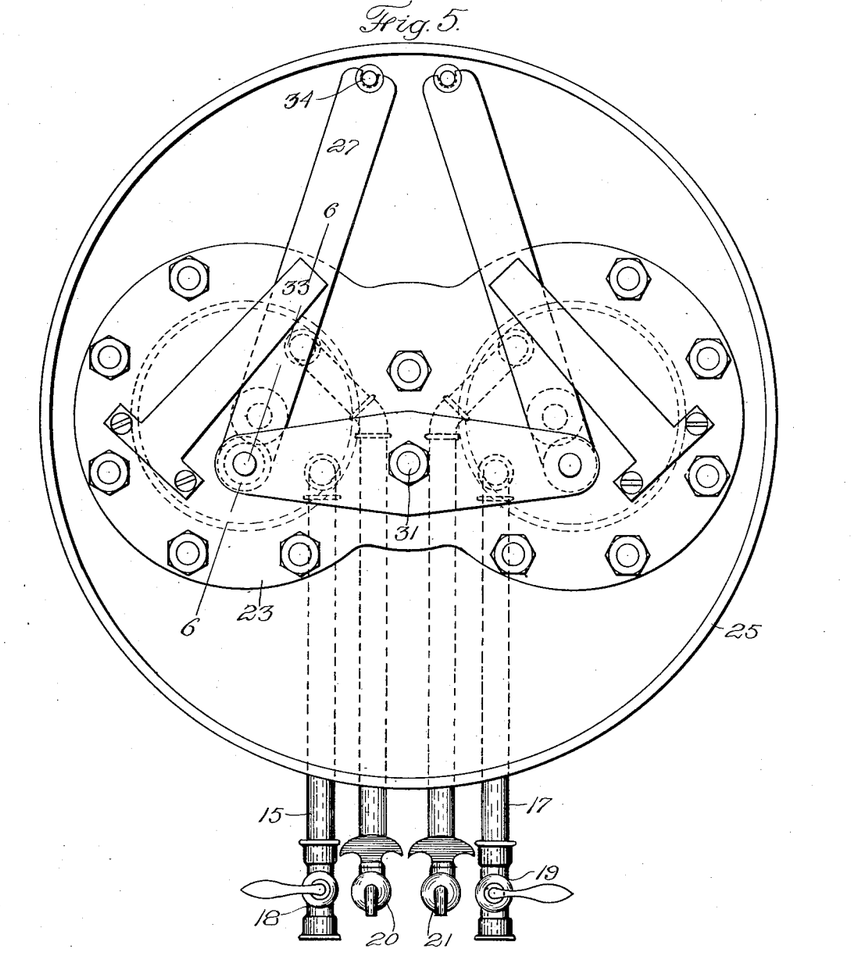
Fig. 5 is a view in front elevation of the back portion of the indicator mechanism.

In order to explain my invention fully, I have herein shown the apparatus as provided with two coöperating sets of mechanisms for operating in connection with two engines, as for instance the port engine and starboard engine, and hence as best shown in Fig. 5, it will be seen that I have provided two diaphragms and two sets of mechanisms, and as these are both similar it will be sufficient to describe one only. The diaphragm 22 is made water tight by having its periphery tightly pressed against the boss 24 by any suitable means, as by a wire ring 32 which serves to bend the peripheral edge of the diaphragm tightly into a wire-receiving recess or pocket, as clearly shown in Fig. 6. The lever 27 is normally held toward the diaphragm under proper pressure by any suitable means, as by a leaf spring 33 and the free end of the lever is held in proper position by a guide pin 34 projecting forward from the back of the casing 25. Adjacent its free end, the lever 27 is engaged by a plunger 35 mounted to move freely lengthwise in a barrel or guiding support 36. Said plunger is provided with a slot 37 for receiving a pin 38 fast in the barrel 36, whereby the movement of the plunger is limited, and at its inner end said plunger bears against an arm 39 pivoted at 40 in a post 41 which projects rigidly from a carrying plate 42. The arm 39 carries at its forward end a wide pawl 43 pivoted thereto at 44 and engaged by the free ends of a spring 45 which passes at either side of the arm 39 rearwardly over the ends of the pivot 40, see Fig. 7, and is looped under the tail end 46 of a detent pawl 47 pivoted at 48 in said post 41, said spring thereby serving to hold the arm 39 and plunger 35 outwardly and the dog 43 and detent pawl 47 inwardly, the latter two engaging a ratchet wheel 49 of the counter mechanism. This counter mechanism may be of any well known or preferred kind, modified in accordance with my invention. In the drawings I have shown a counter which, in the main, is of an old and usual type, and hence I will only explain the details whereby I have modified it to carry out the requirements of my invention. The ratchet wheel 49 is fast on one end of a shaft or sleeve 50 on whose other end is fast a gear 51 and a double counter wheel 52 secured on said shaft by a set screw 53, the remaining counters 54—57 being loose on said shaft and operated in usual manner in connection with gears 58 and pinions 59. As before mentioned, there are two sets of mechanisms, one for the port engine and one for the starboard engine. In the hollow shafts or sleeves 50 of these counters I mount longitudinally movable pins 60, 61 on whose projecting inner ends is mounted to rotate a worm shaft 62 provided at its ends with clutch members 63, 64 respectively whereby it may be caused to engage with either of the counters as desired, being shifted by a rotary cam post 65 in opposition to a spring 66. The worm 62 is in mesh with a worm wheel 67 fast on a shaft 68 journaled at its ends in posts 70, 71 and provided with a worm 72 meshing with a worm wheel 73 on a transverse shaft 74 provided with a friction wheel 75 mounted in position to engage a friction disk 76 clamped by a nut 77 to move with a post 78 provided with a head 79 whose flange 80 is marked to indicate the log units as viewed through a sight opening 81. In the post 78 is secured a shaft 82 provided on its lower end with a pinion 83 in mesh with an internal gear 84 held in proper position by a housing 85 within said head 79. The face 86 of said gear 84 is marked to indicate log hundreds through said opening 81. The friction disk 76 may be of any suitable material, being preferably a fine emery wheel or stone disk, and the coöperating wheel 75 is preferably composed of hardened steel and its engaging periphery reduced to an edge as clearly shown in Fig. 4 so as to give increased accuracy of engagement and movement. In order to permit this wheel 75 to be adjusted with extreme nicety when the parts are all in position, I have mounted the same loosely so as to slide on the shaft 74 and have connected it by a screw 87 threaded in an enlarged hub 88 fast on said shaft, the opposite end of said screw being held by its flanged head 89 in said wheel 75 against movement transversely of said wheel 75 while said screw is free to rotate therein for desired adjustment with relation to the hub 88. Delicacy of engagement between said wheel 75 and disk 76 is provided by mounting the journal bearing of the adjacent end of the shaft 74 between a spring 91 and the concave lower end of a post 92, said post having threaded engagement with the top of an A-shaped supporting bracket 93, which also supports lower down the opposite ends of the spring 91. The face 80 of the head 79 is held sufficiently away from the adjacent supporting plate 42 so as not to be injured or retarded thereby by a leaf spring 94 fast at 95 and provided at its free end with a stud engaging the end of the pinion post 82 with a rearward pressure (upward as shown in Fig. 4) sufficient to hold said face in the position desired. Opposite the sight opening 81, see Fig. 1, is a sight opening 96 through which indications or markings 97 may be read showing the revolutions which, under any given circumstances, are necessary to drive the vessel one mile. These markings 97 are on the face of a regulating wheel or plate 98 journaled at the back of the supporting plate 42 on a post 99, as best shown in Figs. 3 and 4. This plate is milled or roughened at 100 to facilitate its being turned by the finger of the user.

The regulating wheel 98 is provided with a hub 101 containing a spiral groove 102 in which travels a tongue 103 mounted in the free end 104 of an angular lever 105 which is secured adjacent its lower end on a rod 106 pivoted at its ends in fixed posts 107. The adjacent end of the shaft 74 is journaled in bearings 108 movably supported at the bend or elbow of the lever 105. The tongue 103 is preferably held forward by a spring 109 contained in the end 104 of said lever. Thus when the observer or user turns the regulating plate 98 one way or the other and thereby correspondingly moves the spiral 102, the tongue 103 which engages said spiral is caused to rise or fall and correspondingly rocks the lever 105 on its pivot 106 as a center, the result being that the shaft 74 is moved lengthwise, sliding in its bearing 90, and thereby the friction wheel 75 is moved radially of the friction disk 76, which results in rotating the log-indicating members 80, 86 correspondingly faster or slower according as the friction wheel 75 is moved away from or toward the center thereof. The navigator determines (from well known data) the number of revolutions of the propeller necessary to propel the vessel one mile under the existent conditions of wind, current, draft, condition of the bottom, etc., which govern what is termed the slippage and then turns the regulating wheel or plate 98 so as to bring into view at the sight opening 96 the figure denoting the number of revolutions so determined, and this automatically sets the log indicating means in proper condition to indicate at the sight opening 81 in miles the distance traveled. This saves a large amount of computation heretofore necessary in connection with the usual indicating apparatus, and at once determines automatically the number of miles (or knots or other units of measurement) traveled by the vessel, with the engine going at a given speed. The miles are indicated at the right hand side, at the sight opening 81, and the determined speed of the engine or number of revolutions necessary to drive the vessel one mile is indicated at the left hand side, at the opening 96. The dial or face of the apparatus is also provided with a sight opening 110 through which the position of the cam post 65 is shown as indicated at 111, thereby indicating to the observer whether the starboard engine or the port engine is being taken account of at any given time. Through sight openings 112, 113 the respective counters which are provided for the respective engines are viewed, and the whole is inclosed by a transparent protector 114.

Figures 7, 8, 9, 10, 11:
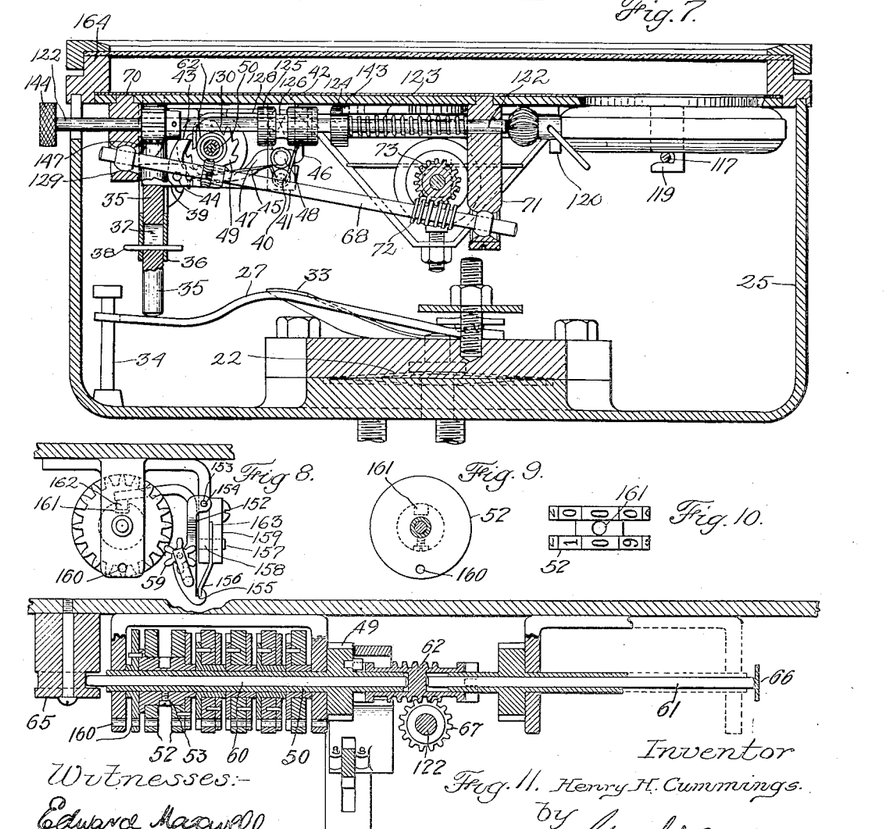

The old system which is commonly in use refers the usual log data to revolutions per minute, and accordingly a further feature of my invention consists in providing means whereby the navigator can ascertain at any moment the speed of the engine per minute. In the preferred embodiment, I mount a stop watch 115 behind a sight opening 116 in a dial, being herein shown as held in by an arm 117 pivoted at 118 and caught under a post 119, Figs. 3 and 7, said watch being partially suspended on pins 120. The stem 121 of the stop watch (by which it is operated in well known manner) is engaged by the end of a rod or plunger 122 mounted in the posts 70 and 71, as best shown in Fig. 7, and normally retracted by a spiral spring 123 which bears against the post 71 at one end and against a collar 124 at its other end. The rod 122 is also provided with a cam block 125 fast thereon in which studs 126, 127 project from elbow-shaped levers 128 pivoted at their upper free ends at the fixed point 48 and extending at their lower ends forward, see Fig. 7, where they are upturned at 129 to be engaged by the pawls 43 at desired times. When the shaft or rod 122 is rocked in one direction, its cam 125 shifts one of the levers 128 down so that it cannot be engaged by the adjacent pawl 43 and shifts the other one up so that it will be engaged by its adjacent pawl 43. To cause the desired engaging movement of said pawl, I provide in the adjacent ratchet wheel 49 one deep tooth or notch 130, which permits the pawl to have an extra downward movement once in each rotation of said ratchet wheel.

If the coöperating lever 128 is, in its raised position at that time, the result is that said lever is depressed by said pawl, which movement operates through the stud 126 and cam block 125 to reciprocate the rod 122 to the right, Fig. 7, and thereby start the stop watch. This reciprocation is repeated on the next rotation of the ratchet wheel, thereby stopping the watch at the end of ten step-movements of the counter, i. e. at the end of one hundred revolutions of the propeller (one impulse in ten revolutions being preferable in connection with a high speed engine; such as herein represented). The next rotation of the ratchet wheel will return the hand to 0, the next rotation will again start the stop watch, and so on, the stop watch being started on each third reciprocation of the rod 122. To relieve the user of the necessity of waiting in front of the stop watch during the time necessary for these three reciprocations, I provide a bell 131 whose striker rod or spring 132 is supported and actuated by a block 133 operated by a cam 134 against which it is held by a spring 135. Said cam 134 has five teeth, as herein shown, and beneath it is an operating ratchet wheel 136 provided with fifteen teeth engaged by a pawl 137 pivoted at the free end of a lever 138 and held by a spring 139 in constant engagement with the ratchet 136, said lever 138 being pivoted to the plate 42 at 140. A dog 141 prevents backward movement of the ratchet wheel, being held yieldingly against the same by a spring 142. The lever 138 is actuated by the collar 124. Said collar is cut away on its under side at 143, see Fig. 7, so as to be incapable of actuating the lever 138 when the rod 122 is turned to its off position, i. e. with both of the pawls 129 down or inoperative. To permit said rod to be turned manually, it is provided at its outer end with a knurled head 144 whereby it may be grasped between the thumb and finger and rotated, and opposite a sight opening 145 it is provided with a block 146 marked properly to indicate its position, as to indicate for instance whether it is turned to the off position or turned to coöperate with the port counter or with the starboard counter, said block, and hence the rod, being yieldingly held in either of said positions to which it may be turned, by a spring detent 147.

A chart or table 148 is provided on the dial just above the stop watch 115 containing a series of columns of figures 149 giving the number of revolutions per minute computed from the seconds required for one hundred revolutions, the number of seconds being indicated at the top of each column at 150 and the fractions of seconds in fifths at the side at 151. Thus if the stop watch shows that one hundred revolutions of the propeller shaft consumed fifteen and two-fifths seconds, a glance at the chart under the column headed "15" and in the horizontal line denoted by "2/5" shows that the shaft is turning at the rate of 389.6 revolutions per minute. This enables the navigator to conform his log book at once to the common practice of setting down his records in revolutions per minute if desired. To permit the counters to be restored to zero at any time by the operator, without disturbing any of the rest of the records or mechanism, I mount the pinions 59 and their supporting shaft in a frame 152 pivoted at 153 to an upright 154 of the main frame which carries the entire counter, said frame 152 having at one end a notch 155 in position to be engaged by a detent 156 pivoted at 157 whereby it is held in retracted position when the frame 152 and the pinions 59 are swung back out of engagement with the counter wheels. At this time a tooth of each pinion enters a notch or recess 158 in the upright 154 so that said pinions cannot accidentally get out of proper relative position. The counter wheels and the end uprights 159 of the main frame are provided with holes 160, said holes being in alinement when all the counters show zero at the front through said opening, said holes being for the purpose of receiving a pin or wire so that they may be held in place successively as they are freely turned by the operator to desired position prior to being reengaged by their pinions 59 (which, as stated, have been moved back therefrom to permit the counter to be restored to zero), and the end counter wheel 52, is provided with a hole or notch 161 to be engaged by the upturned end 162 of a finger which projects from the under edge of the frame 152, so that said frame cannot be tipped back from the counters until the first counter wheel has been brought to correct zero position, and then the swinging back of said frame 152 from the counters, causes the finger end 162 to enter the hole 161 and thereby simultaneously lock said first counter wheel, and hence its actuating shaft 50, ratchet wheel 49, etc. in correct position. The tail end 163 (see Fig. 3) of the spring detent 156 is bent inward to press against the adjacent end of the frame 152 for normally holding the latter forward in proper position to maintain the pinions 59 in operative engagement with the counter wheels.

As already stated, the general construction of the counter mechanism is not new with me, as I prefer to employ regular commercial counters so far as their mechanism will carry out my object. The plate 42 which carries most of the mechanism above described is secured in a frame or ring 164 hinged at 165 to the main shell or casing 25 to enable the user readily to swing said parts open in order to operate the plate 98 or the post 65 or to restore the counters to zero whenever desired. At the opposite sides of the watch, the outer face of the cover glass 114 is preferably ground or frosted to provide memoranda areas 166 on which the user may note in pencil any desired memoranda which is to be subsequently rubbed off.

In use, the navigator, knowing the slip of the screw, draft of the vessel, condition of the bottom, current, wind, etc., determines the number of revolutions of the screw under the said conditions necessary to drive the vessel one mile, and then turns the plate 98 until the said number of revolutions is indicated at the sight opening 96. The door or plate 42 and its supported mechanism is then swung closed, whereupon the pulsations from the engine are communicated to the train of mechanism, with the result that the number of miles being traveled by the vessel is indicated by the members 80, 86 at the sight opening 81. This indication takes place simultaneously at the bridge, chart room, engine room, and wherever else one of the instruments may be placed, and inasmuch as the communicating medium is a cold fluid, preferably water, the operation is uniform irrespective of the position, exposed or otherwise, in which the instrument may be placed. As herein shown, the connection from the shaft of the high speed engine or turbine engine is such that one impulse in the pipe 12 is permitted by the valve 5 to ten revolutions. In a slower speed engine, as for instance one of the reciprocating type, the reciprocations can be transmitted directly instead of one to ten, in which case there would be no necessity of the valve 5, inasmuch as it would be practicable to transmit the impulses directly as they take place in the engine, and hence the pipe 12 would be connected to one end of the cylinder. The forward impulse communicated through the pipe 12 raises or projects the diaphragm 22, thereby raising the spring lever 27 by the engagement therewith of the pin 26, the free end of said lever depressing the plunger 35 and thereby operating the pawl 43, which, by its engagement with the ratchet 49, actuates the counter. This operation takes place simultaneously and continuously in both counters, which therefore keep track of the number of revolutions of both the port engine and the starboard engine (or such other number of engines as the vessel contains and the instrument is provided for) continuously throughout the entire voyage. The normal position of the worm 62 is as shown in the drawings, where it is coupled with the counter of the starboard engine, and under ordinary conditions it remains in this position so as to continuously operate the log indicating mechanism at the sight opening 81 with reference to said starboard engine. The ratchet movement of the starboard counter serves to turn said worm at each ratchet movement and thereby rotate the shaft 68 and, through the worm 72 and worm wheel 73, turn the shaft 74 whose friction wheel 75 turns the friction disk 76, thereby turning the single-mile indicator 80 and the one-hundred-mile indicator 86 at the sight opening 81. If the starboard engine should shut down or for any other reason the navigator should wish to get the readings from the port engine, he simply turns the cam post 65 from the position shown in Fig. 3 until the rod 60 has moved the worm 62 to the right, Fig. 3, causing the clutch 64 to couple said worm with the port counter, whereupon the latter thereafter operates the log indicator. If for any reason the navigator does not wish to operate the log indicator, he simply turns the cam post 65 to an intermediate position, so that neither the clutch 63 nor the clutch 64 is in driven engagement with either of the counters, whereupon the log indicating mechanism remains idle while the counters continue to operate. Whenever the navigator wishes to know the number of revolutions per minute that the engine is making, he turns the thumb piece 144 to the left or the right according as he wishes to ascertain the revolutions per minute of the starboard engine or the port engine. This results in raising the lever 128 into operative relation with the pawl 43 of the counter of that engine, and as said pawl reaches the deep notch 130 of its ratchet, it thereby depresses said lever and through the pin 126 or 127 as the case may be, and the cam block 125 moves the shaft 122 downwardly, thereby starting the stop watch 115, which keeps going until the said ratchet has made one complete turn, or in other words has indicated one hundred revolutions of the engine, whereupon the deep notch 130 again permits the shaft 122 to move downward as before, thereby instantly stopping the watch. Thus the time denoted by the watch indicates the time of one hundred revolutions of the engine. Referring to the table 148 in accordance with the time denoted by the watch, as previously explained, the navigator immediately knows the number of revolutions per minute or speed of the engine per minute. If, under any special circumstances, as in connection with gunnery, or going over a measured mile, or any other purpose which frequently arises in connection with Government vessels, it is desired to use the stop watch independently of the counters, the navigator simply turns the thumb piece 144 to a neutral position and then depresses the same, thereby moving its shaft 122 downward manually the same as it was moved before automatically, operating the stop watch exactly the same as already described excepting that it is done by hand and not by the automatic mechanism.

Besides the advantage which my invention affords of being adaptable to all positions and situations, one important advantage resides in providing means for making the record in units (preferably in miles) for any desired number of revolutions, so that the navigator can first determine the number of revolutions which he desires to constitute a mile and then sets the instrument, so that thereafter it will automatically indicate the number of miles or units traveled in accordance with the standard or fixed mile value previously determined by him.

It is well known that in navigating there are a multitude of outside conditions which must be taken into consideration by the navigator in order to figure out the actual distance traveled, as for instance those already mentioned, such as the slip of the screw, draft of the vessel, condition of the bottom, current, wind, etc., and it has heretofore been necessary, in order to know the distance traveled, to ascertain from the engine room the number of turns from the engine, and then figure out more or less laboriously the probable distance traveled. My apparatus does this automatically and progressively as it occurs, so that the exact situation may be read at any time. In this matter I consider that I am a pioneer, inasmuch as my present invention is the first to determine this result automatically. For this reason I have referred to the apparatus as an engine log because its determinations are derived directly from the engine. It may be well, also, to direct particular attention to the fact that my apparatus is broadly new in providing means to indicate the length of time required for a given number of revolutions of the engine. Similarly it is new to render said means capable of accomplishing said indication at any time desired.

Having described my invention, what I claim as new and desire to secure by Letters Patent is:

1. In an apparatus of the kind described, the combination with the engine, of automatic means to indicate the length of time of a given number of revolutions of the engine, including stop-watch mechanism, means to start said watch, automatic means responsive to the engine to stop said watch mechanism at the end of said given number of revolutions of the engine, and signaling mechanism to signal to the navigator before said watch mechanism is restored again to starting position.

2. In an apparatus of the kind described, the combination with a plurality of ship's engines for propelling a ship, of automatic means to indicate the length of time of a given number of revolutions, and manually controlled means for rendering said automatic means responsive to any one of said engines desired, including visual means indicating automatically which engine said automatic means is responding to.

3. In a device of the character described, means adjustable in accordance with the number of operations of some part of any one of a plurality of the ship's propelling mechanisms necessary to propel the ship a unit of distance, a result-indicator operable by said propelling mechanism, means adjustable by the adjustment of the first mentioned means to vary the amount of movement of said result-indicator relatively to a given number of said operations, and manually controlled means for connecting said result-indicator to any one of said plurality of propelling mechanisms as desired.

4. In an apparatus of the kind described, the combination with a plurality of ship's engines for propelling a ship, of means capable of being actuated by any one of said engines and having manually operated adjustment with reference to the ship's slippage and other external travel-affecting conditions for indicating the distance traveled by the ship through the water in terms of distance units or measurements, and manually controlled means for connecting said indicating means to any one of said engines as described, including visual means indicating automatically which engine is actuating said indicating means.

5. In an apparatus of the kind described, the combination with a plurality of ship's engines for propelling a ship, of automatic means responsive to the movements of any one of said engines to indicate distance measurements, regulating means for said automatic means for setting the latter in accordance with the number of revolutions of the engine necessary to make a unit of said measurement, and manually controlled means for rendering said automatic means responsive to any one of said engines desired.

6. In an apparatus of the kind described, the combination with a plurality of ship's engines for propelling a ship, of automatic means responsive to the movements of any one of said engines to indicate distance measurements, regulating means for said automatic means for setting the latter in accordance with the number of revolutions of the engine necessary to make a unit of said measurement, and manually controlled means for rendering said automatic means responsive to any one of said engines desired, including visual means indicating which engine said automatic means is responding to.

7. In an apparatus of the kind described, the combination with a plurality of propelling mechanisms for propelling a device through a fluid medium, of means for indicating the distance traveled operable by any one of said propelling mechanisms as desired, a plurality of counter mechanisms, one for and operable by each propelling mechanism, means for connecting said indicating means to operate with any one of said propelling mechanisms and in connection with the counter mechanism of the said propelling mechanism so connected, means adjustable to indicate the number of operations of said connected propelling mechanism necessary to propel said device a unit of distance, and means adjustable by the adjustment of the last mentioned means to vary the amount of movement of said distance-traveled indicating means relatively to a given number of said operations.

8. In an apparatus of the kind described, the combination with a plurality of engines for propelling a ship, of a counter mechanism actuated by each engine for indicating the revolutions of its engine, log indicating mechanism, and connecting means for connecting said log indicating mechanism to operate with one or the other of said counter mechanisms as desired, said connecting means having also a neutral position for rendering said log indicating mechanism independent of said counter mechanisms.

9. In an apparatus of the kind described, the combination with a plurality of ship's engines for propelling a ship, of a corresponding number of counter mechanisms, one for and operated by each engine to indicate the revolutions thereof, distance indicating mechanisms operable in connection with said counter mechanisms, and means under the control of the user for setting said distance indicating mechanism to indicate a unit of distance for any desired number of counts of said counter mechanisms.

10. In an apparatus of the kind described, the combination with a plurality of engines for propelling a ship, of a corresponding number of counter mechanisms, one for and operated by each engine to indicate the revolutions thereof, distance indicating mechanism operable at the will of the user in connection with any one of said counter mechanisms, and means under the control of the user for setting said distance indicating mechanism to indicate a unit of distance for any desired number of counts of the counter mechanism with which said distance indicating mechanism is being operated.

11. In an apparatus of the kind described, the combination with the engine for propelling a ship, of counter mechanism, including connections therefrom to the engine for continuously operating said mechanism to count the number of revolutions of the engine, and engine log indicating mechanism operable at the will of the user in connection with said continuously operating counter mechanism.

12. In an apparatus of the kind described, the combination with a plurality of engines for propelling a ship, of a corresponding number of counter mechanisms continuously operated to indicate the revolutions of the engine, one for each engine, and means operable at the will of the user in connection with any one of said counter mechanisms for automatically translating the operations of the counter mechanism into other data useful to the navigator.

13. In an apparatus of the kind described, the combination with a plurality of engines for propelling a ship, of a corresponding number of counter mechanisms continuously operated to indicate the revolutions of the engine, one for each engine, means operable at the will of the user in connection with any one of said counter mechanisms for automatically translating the operations of the counter mechanism into other data useful to the navigator, and means to indicate with which engine said translating means is being used at any given time.

14. In an apparatus of the kind described, the combination with the engine for propelling a ship, of remote indicating mechanism responsive to the revolutions of the engine, and operating connections from said engine to said indicating mechanism extending through parts of the ship having different temperature conditions, including a column of liquid, engine-controlled means for varying the pressure in said column, and independent means for regulating the freedom of movement of the liquid in said column.

15. In an apparatus of the kind described, the combination with the engine, feed pump, and boiler of a ship, of remote indicating mechanism responsive to the revolutions of the engine, and operating means for said indicating mechanism, including a column of cold water tapped from the feed water in its passage from the feed pump to the boiler while under full boiler pressure, and a controlling valve for said column actuated by a moving part of the engine.

16. In an apparatus of the kind described, engine indicating mechanism, including a counter responsive to the revolutions of the engine, and other indicating means also responsive to the revolutions of the engine, impulse-giving connections from the engine to the aforesaid means and counter, continuously connected to the counter, and manually controlled mechanism for connecting and disconnecting said means with said impulse-giving connection.

17. In an apparatus of the kind described, engine indicating mechanism, including a counter responsive to the revolutions of the engine, and other indicating means also responsive to the revolutions of the engine, impulse-giving connections from the engine to the aforesaid means and counter, continuously connected to the latter, and manually controlled mechanism for connecting and disconnecting said means with said impulse-giving connections, including a clutch, and a shipping rod mounted for longitudinal movement coaxially of said counter.

18. In an apparatus of the kind described, engine indicating mechanism, including a counter responsive to the revolutions of the engine, and other indicating means also responsive to the revolutions of the engine, impulse-giving connections from the engine to the aforesaid means and counter, continuously connected to the latter, and manually controlled mechanism for connecting and disconnecting said means with said impulse-giving connections, including a clutch, a shipping rod mounted for longitudinal movement coaxially of said counter, and a pivoted cam post for moving said rod.

19. In an apparatus of the kind described, engine indicating mechanism, including a counter responsive to the revolutions of the engine, provided with a plurality of counter wheels, step-by-step actuators therefor, means for holding the units wheel in undisturbed position while permitting the remaining counter wheels to be turned back to zero position, and means, including the provision of alined transverse holes in said several wheels and a pin to enter said holes, for holding all of said wheels in desired zero position while the entire counter is being restored again to operative condition.

20. In an apparatus of the kind described, the combination with an engine for propelling a ship, of engine indicating mechanism, operating means therefor responsive to the revolutions of the engine, and regulating means operative on said operating means at a point between the engine and the indicating mechanism for varying, according to the determinations of the navigator, the result indicated by said indicating mechanism, including a friction disk for moving the result-indicating portion of the mechanism, and a friction driving wheel having edge engagement with said disk and adjustable toward and from the center of the latter for varying the speed thereof.

21. In an apparatus of the kind described, the combination with an engine for propelling a ship, of engine indicating mechanism, operating means therefor responsive to the revolutions of the engine, and regulating means operative on said operating means at a point between the engine and the indicating mechanism for varying, according to the determinations of the navigator, the result indicated by said indicating mechanism, including a grit-surfaced disk for moving the result-indicating portion of the mechanism, and a friction driving wheel having edge engagement with said disk and adjustable toward and from the center of the latter for varying the speed thereof.

22. In an apparatus of the kind described, the combination with an engine for propelling a ship, of engine indicating mechanism, operating means therefor responsive to the revolutions of the engine, and regulating means operative on said operating means at a point between the engine and the indicating mechanism for varying, according to the determinations of the navigator, the result indicated by said indicating mechanism, including a friction disk for moving the result-indicating portion of the mechanism, and a friction driving wheel having edge engagement with said disk and adjustable toward and from the center of the latter for varying the speed thereof, said driving wheel having its driving periphery beveled to a substantially sharp edge.

23. In an apparatus of the kind described, engine indicating mechanism, operating means therefor responsive to the revolutions of the engine, and means for varying, according to the determinations of the navigator, the result indicated by said indicating mechanism, including a hand-rotated plate provided with a threaded hub, a pivoted angle lever turned on its pivot by said threaded hub, a friction disk for moving the result-indicating portion of the indicating mechanism, a friction driving wheel having edge engagement with the face of said disk and movable toward and from the center thereof for varying the speed of the disk and a shaft for said wheel connected to and moved longitudinally by said angle lever.

24. In an apparatus of the kind described, engine indicating mechanism, operating means therefor responsive to the revolutions of the engine, and means for varying, according to the determinations of the navigator, the result indicated by said indicating mechanism, including a hand-rotated plate provided with a threaded hub, a pivoted angle lever turned on its pivot by said threaded hub, means for moving the result-indicating portion of the indicating mechanism, and connections from said angle lever to said moving means for varying the speed of the latter in accordance with the position of the angle lever.

In testimony whereof, I have signed my name to this specification, in the presence of two subscribing witnesses.

HENRY H. CUMMINGS.

Witnesses:
 Geo. H. Maxwell,
 M. J. Spalding.